United States Patent Office 3,345,886
Patented Oct. 10, 1967

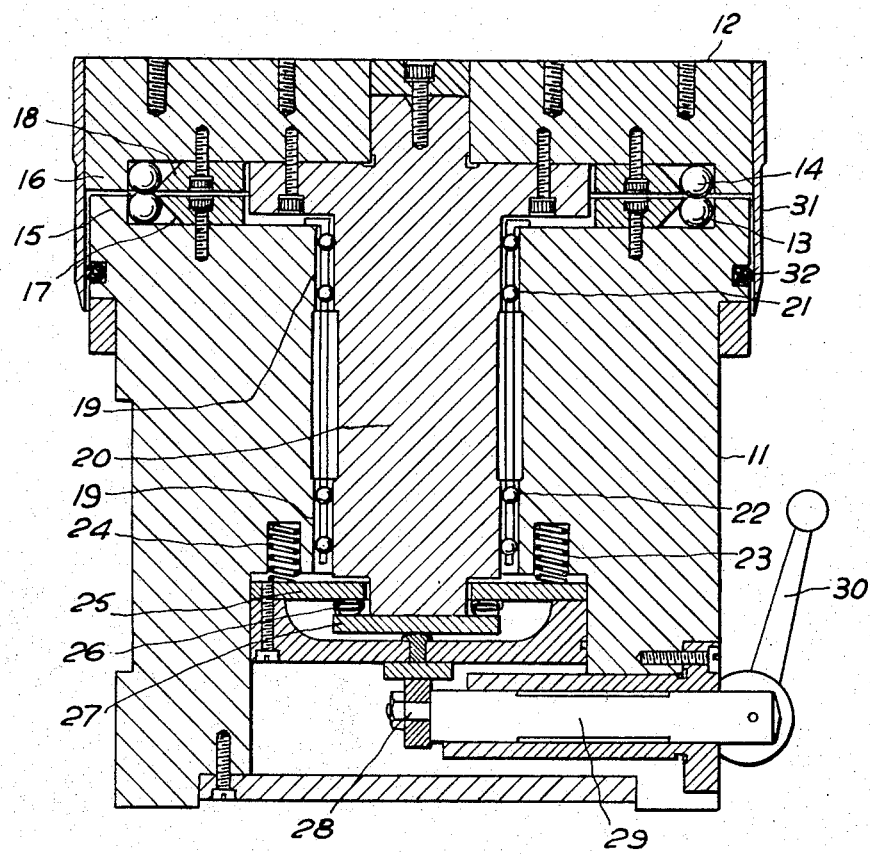

3,345,886
INDEXING DEVICES
William Orpin Jennings and Gilbert Robinson, Teddington, England, William Frederick Atkins, deceased, late of Teddington, England, by Doris I. Atkins, administratrix, Bexhill-on-Sea, England, and Geoffrey Nelson Partridge, Teddington, England, assignors to National Research Development Corporation, London, England
Filed May 25, 1965, Ser. No. 458,788
Claims priority, application Great Britain, May 27, 1964, 21,983/64
4 Claims. (Cl. 74—826)

This invention relates to indexing devices, that is to say, devices in which one part can be displaced relative to another through discrete intervals.

One common form of such device is the division plate which has one or more concentric rows of occurately spaced holes capable of registering with a fixed pin and it has been proposed to construct a division plate by securing a row of spheres of equal diameter in a circular groove which they just fill, but it is difficult to ensure accurate register with a pin or the like. It has further been proposed to construct an indexing device of two discs each bearing a circle of very accurately formed serrations of equal spacing, the serrations on one disc fitting closely with those on the other. This construction is potentially capable of very high accuracy but is expensive to manufacture.

An object of the present invention is to provide an indexing device which while capable of high accuracy and rapid setting can be produced cheaply because only a relatively small amount of high precision machining is required.

According to the present invention there is provided an indexing device comprising two relatively displaceable members each carrying at least one row of contiguous but discrete index members received in a groove and presenting a uniform series of part spherical surfaces facing outwardly of such groove, the grooves in the two displaceable members being formed in confronting surfaces of these members and in alignment so that the spherical surfaces of the two rows of index members intermesh.

The indexing members are preferably spheres and to enable them to intermesh the spheres must project sufficiently from the general surface of the part carrying them but by a distance less than the sphere radius.

In a preferred form of embodiment of the invention the spheres are suitably retained between a cylindrical surface and a conical surface so that a groove with one inclined side is formed, tapering towards its mouth. The sides of the grooves are formed in separate members which can be axially adjusted so that the inclined side forces the spheres against the cylindrical side. The latter needs to be made to a very high degree of accuracy, but the other side only to a high class standard of workmanship. Steel balls manufactured for ball bearings form a convenient, easily available and cheap source of sphere of requisite accuracy and quality. They are commercially available, correct in diameter to a few micro inches and they can be selected to a still higher degree of equality. The various features and advantages of the invention will be apparent from the following description of an exemplary embodiment of the invention which is illustrated in the drawing.

The drawing shows a section through an indexing table that may be used with the same accuracy with its axis horizontal as vertical. The table comprises two relatively rotatable parts or members indicated generally by references 11, 12. Each part is recessed to hold a ring of close packed steel bearing balls 13, 14 selected for equality of size which serve as the indexing memebrs. The ring 13 is restrained by an upstanding rim 15 and the ring 14 by a rim 16. The internal surface of each rim is worked very accurately to a cylindrical form. As shown, the rims 15, 16 are integral with the parts 11, 12, but if convenient the rims could be made as separate annuli and be bolted to the parts 11, 12. In order fully to restrain the spheres in their required positions complementary means to the rims 15, 16 are provided. These are annuli 17, 18. The rims 15, 16 and the annuli 17, 18, form opposite side walls of grooves in the parts 11, 12. The annuli 17, 18 are formed, as shown, with their outer surfaces conical, so that when bolted to the parts 11, 12 respectively the conical faces bear against the rings of balls 13, 14, performing the dual purpose of holding them in contact with the rims 15, 16 and preventing them from being axially dislodged relative to the parts 11, 12.

Part 11 is provided with a bore 19 accurately concentric with the inner face of rim 15, and part 12 is provided with a projecting shaft 20 accurately concentric with the inner face of the rim 16. Shaft 20 is supported accurately concentrically within bore 19 by means of ball bearings 21, 22. If the device is to be used solely with vertical axis then shaft 20 may be cleared with respect to bore 19. When the two parts 11, 12 are assembled as shown, the two rings of balls, having equal numbers of balls in each ring, mesh with one another. The balls are held from jumping out of mesh by means of springs 23, 24, which through a plate 25 and needle roller bearing 26, force down a flange 27 on the end of the shaft 20 and thus spring-load the two rings of balls into meshing engagement. Where the position of meshing is to be changed, the shaft 20 is raised by means of the eccentric 28, operated through shaft 29 by lever 30 which releases the spring loading on the rings of balls and facilitates relative movement of the parts 11 and 12.

The surfaces on which the balls bear are preferably hardened so that bedding of the balls does not take place. Dust is excluded from the interior parts of the indexing device by means of the cylindricla shroud 31, cooperating with a flexible O-ring 32.

The number of balls in a row fixes the minimal fraction of a whole circle through which the table can be indexed. For example, if there are 60 balls in a row the table can be indexed through 6° as a minimum. There is no limit on the number of balls that may be put in a row, but it is recommended that the minimum diameter that should be used is ⅛-inch. Below this the meshing tends to become indefinite. Any wear that may be suffered by the bearing surfaces of the balls may be corrected by turning them slightly.

With one indexing stage (two rings of balls) as shown to index through one degree would require 360 balls in each ring. This, with the minimum size ball, would require a table diameter of the order of 14 inches. The total number of spheres and the table diameter can be substantially reduced by effecting the indexing in two stages. This involves a similar device in series with that already described, that is to say, mounted on a common axis and with one part common to the two devices. Then if for example the first stage has 40 balls in each ring and the second 36 balls, the first will index by a minimum angle of 9° and the second by 10°. If the first be indexed negatively by one space and the second positively by one space the net change in angle is 1°. The table diameter, with the same diameter balls as for one stage only, could be of the order of 2 inches. An alternative would be to make the diameter say 6 inches and increase the ball diameter to improve meshing.

What is claimed is:
1. An indexing device comprising first and second relatively displaceable members each carrying at least one row of contiguous but discrete index members received in an annular groove and presenting a uniform series of part spherical surfaces facing outwardly of such groove, the grooves in the two displaceable members being formed in confronting surfaces of these members and in alignment so that the spherical surfaces of the two rows of index members intermesh, the first said displaceable member including a shaft rigidly connected thereto and extending through a bore in the second said displaceable member, the shaft and bore being coaxial with said annular grooves and extending to one side of the planes containing the annular grooves, a flange member connected to the end of the shaft remote from the said planes of the grooves, spring means acting through bearings between the second displaceable member and the flange member for urging the two grooves towards each other, and a release means including a control shaft and an eccentrically mounted element on said control shaft in operative engagement with the side of the flange member opposite from that side on which the said spring means acts, whereby rotation of the control shaft causes the eccentrically mounted element to oppose the said spring means to allow limited separation of the two displaceable members relative to each other.

2. A device as claimed in claim 1 wherein the index members are spheres of uniform size in the two rows.

3. A device as claimed in claim 1 wherein at least one side wall of a groove in one of said displaceable members is inclined with respect to the opposite side wall so that the index members are held captive in such groove.

4. A device as claimed in claim 1 wherein one side wall of a groove in one of said displaceable members is of conical form and the opposite side wall of such groove is of cylindrical form so that such walls diverge in a direction inwardly of the groove.

References Cited
UNITED STATES PATENTS

| | | | |
|---|---|---|---|
| 2,233,950 | 3/1941 | Lepetit | 74—826 |
| 3,091,133 | 5/1963 | Hoeger | 74—826 |

FRED C. MATTERN, JR., *Primary Examiner.*